(12) United States Patent
Minh

(10) Patent No.: US 6,296,962 B1
(45) Date of Patent: Oct. 2, 2001

(54) DESIGN FOR SOLID OXIDE FUEL CELL STACKS

(75) Inventor: Nguyen Q. Minh, Fountain Valley, CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/255,674

(22) Filed: Feb. 23, 1999

(51) Int. Cl.[7] .................................................. H01M 2/14
(52) U.S. Cl. ................................ 429/38; 429/39; 429/34; 429/30
(58) Field of Search .................................. 429/34, 38, 39, 429/30

(56) References Cited

U.S. PATENT DOCUMENTS

| | | |
|---|---|---|
| 2,996,389 | 8/1961 | Fernhof . |
| 3,991,149 | 11/1976 | Hurwitt . |
| 4,276,331 | 6/1981 | Bothwell . |
| 4,379,109 | 4/1983 | Simpson . |
| 4,476,198 | 10/1984 | Ackerman . |
| 4,617,072 | 10/1986 | Merz . |
| 4,728,503 | 3/1988 | Iida . |
| 4,786,597 | 11/1988 | Matson . |
| 4,816,036 | 3/1989 | Kotchick . |
| 4,913,982 | 4/1990 | Kotchick . |
| 5,009,857 | 4/1991 | Haerle . |
| 5,034,288 | 7/1991 | Bossel . |
| 5,162,167 | 11/1992 | Minh . |
| 5,169,811 | 12/1992 | Cipollini . |
| 5,256,499 | 10/1993 | Minh . |
| 5,286,322 | 2/1994 | Armstrong . |
| 5,326,512 | 7/1994 | Stillwagon . |
| 5,376,472 * | 12/1994 | Hartvigsen et al. ................ 429/32 |
| 5,460,897 | 10/1995 | Gibson . |
| 5,549,983 | 8/1996 | Yamanis . |
| 5,691,075 | 11/1997 | Batawi . |
| 5,770,326 * | 6/1998 | Limaye ................................ 429/30 |
| 5,851,689 | 12/1998 | Chen . |
| 5,856,035 * | 1/1999 | Khandkar et al. ................... 429/32 |
| 5,882,809 * | 3/1999 | McPheeters et al. ................ 429/30 |
| 5,993,986 * | 11/1999 | Wallin et al. ....................... 429/32 |

FOREIGN PATENT DOCUMENTS

| | | |
|---|---|---|
| 0 357 025 | 3/1990 | (EP) . |
| 0 397 072 | 11/1990 | (EP) . |
| 0 410 166 | 1/1991 | (EP) . |
| 2-90470 | 3/1990 | (JP) . |
| 4-12468 | 1/1992 | (JP) . |
| 9-177725 | 7/1997 | (JP) . |
| 11-45727 | 2/1999 | (JP) . |
| WO 98/35398 | 8/1998 | (WO) . |

OTHER PUBLICATIONS

Science and Technology of Ceramic Cells, pp. 284, Elsevier (1995).

* cited by examiner

Primary Examiner—Gabrielle Brouillette
Assistant Examiner—R. Alejandro
(74) Attorney, Agent, or Firm—William J. Zak, Jr. Esq.

(57) ABSTRACT

A solid oxide fuel cell stack includes a plurality of solid oxide fuel cells juxtaposed to one another, with at least two of the cells having a substantially flat configuration; and each of the two cells having an anode layer, an electrolyte layer, and a cathode layer. The fuel stack also includes at least one interconnect disposed among the plurality of cells, with the interconnect being capable of providing an electrical connection between the cells, and the interconnect comprising a plurality of first extensions on a first surface of the interconnect and a plurality of second depressions on a second surface of the interconnect. The first extensions and second depressions are integrally formed with one another to provide a plurality of oxidant passageways and fuel passageways.

18 Claims, 3 Drawing Sheets

DESIGN FOR SOLID OXIDE FUEL CELL STACKS

BACKGROUND OF THE INVENTION

The present invention generally relates to solid oxide fuel cells and, more particularly, to an improved solid oxide fuel cell stack which allows for crossflow, coflow, counterflow, and radial flow of a fuel and an oxidant.

A fuel cell is basically a galvanic conversion device that electrochemically reacts a fuel with an oxidant within catalytic confines to generate a direct current. A fuel cell typically includes a cathode material which defines a passageway for the oxidant and an anode material which defines a passageway for the fuel. An electrolyte is sandwiched between and separates the cathode and anode materials. An individual electrochemical cell usually generates a relatively small voltage. Thus, to achieve higher voltages that are useful, the individual electrochemical cells are connected together in series to form a stack. Electrical connection between cells is achieved by the use of an electrical interconnect between the cathode and anode of adjacent cells. Also typically included in the stack are ducts or manifolding to conduct the fuel and oxidant into and out of the stack.

The fuel and oxidant fluids are usually gases and are continuously passed through separate cell passageways. Electrochemical conversion occurs at or near the three-phase boundary of the electrodes (cathode and anode) and electrolyte. The fuel is electrochemically reacted with the oxidant to produce a DC electrical output. The anode or fuel electrode enhances the rate at which electrochemical reactions occur on the fuel side. The cathode or oxidant electrode functions similarly on the oxidant side.

Specifically, in a solid oxide fuel cell (SOFC), the fuel reacts with oxide ions on the anode to produce electrons and water, the latter of which is removed in the fuel flow stream. The oxygen reacts with the electrons on the cathode surface to form oxide ions that diffuse through the electrolyte to the anode. The electrons flow from the anode through an external circuit and then to the cathode, with the circuit being closed internally by the transport of oxide ions through the electrolyte.

In a SOFC, the electrolyte is in a solid form. Typically, the electrolyte is made of a nonmetallic ceramic, such as dense yttria-stabilized zirconia (YSZ) ceramic, that is a nonconductor of electrons which ensures that the electrons must pass through the external circuit to do useful work. As such, the electrolyte provides a voltage buildup on opposite sides of the electrolyte, while isolating the fuel and oxidant gases from one another. The anode and cathode are generally porous, with the anode oftentimes being made of nickel/YSZ cermet and the cathode oftentimes being made of doped lanthanum manganite. In the solid oxide fuel cell, hydrogen or a hydrocarbon is commonly used as the fuel, while oxygen or air is used as the oxidant.

Various designs have been employed for an electrical interconnect used in fuel cell stacks. Likewise, different means have been used for constructing fuel/oxidant manifolds or passageways. One interconnect design is found in U.S. Pat. No. 5,460,897 wherein the interconnect assembly not only provides electrical connection between anodes and cathodes, but also provides the means for fuel/oxidant pathways. The interconnect assembly has a manifold plate with two recesses that define transverse flow channels running perpendicular to one another. One channel is used to flow fuel while the other channel is used for the oxidant. An annular shaped bellows is within a central opening that extends perpendicularly through the manifold plate. The bellows accommodates radial dimensional differences between the manifold plate and an interconnect plate. The interconnect plate is disposed within the bellows and has protrusions on both sides for making electrical contact between adjacent cells, as well as providing spacing for flow of the fuel and oxidant between adjacent cells. Disadvantages to such design, however, are its relative complexity in structure, multiple fabrication steps for the interconnect plate, overall thickness of the interconnect plate, and limitation to crossflow of the fuel and oxidant.

In contrast to U.S. Pat. No. 5,460,897 which uses the interconnect to provide fuel/oxidant passageways, U.S. Pat. No. 5,256,499 discloses various shaped anodes and cathodes which provide different fuel/oxidant passageways. A flat interconnect element connects adjacent cells. Some of the shapes for the anodes/cathodes include corrugation, elongated ribs, and rectangular posts. Flat layers of anode and cathode material are added between the electrolyte and shaped anodes and cathodes, respectively, to aid in bonding to the electrolyte and providing surface area for chemical reactions. However, the use of a gasket element which surrounds the fuevoxidant passageways limits the utility to crossflow. Also, having both the anodes and cathodes shaped into something other than a flat configuration tends to increase the overall thickness of the stack and requires multiple fabrication steps.

In a fashion similar to U.S. Pat. No. 5,256,499, corrugated anodes and cathodes with a flat, trilayer electrolyte wall (or interconnect wall) therebetween is shown in U.S. Pat. No. 5,162,167. The trilayer wall includes anode, electrolyte (or interconnect) and cathode materials. The fuel and oxidant flow can be achieved in a coflow or counterflow pattern. And, again, the non-flat configuration of both the anodes and cathodes tends to increase the stack thickness and requires multiple fabrication steps.

An elongated circular configuration for fuel and oxidant passageways formed by anodes and cathodes is shown in U.S. Pat. No. 4,913,982. A flat interconnect is disposed between adjacent cells. Fuel and oxidant flow can be achieved in coflow or counterflow patterns. Another limitation, as with other past designs, is the overall thickness of the stack which is dictated by the shape of both anodes and cathodes, as well as requiring multiple fabrication steps.

As can be seen, there is a need for an improved solid oxide fuel cell stack which is simple in design and reduces the overall thickness of the stack. Also needed is an SOFC stack which allows flexibility in flow of a fuel and an oxidant. In particular, a stack is needed which allows crossflow, coflow, counterflow, and radial flow of the fuel and oxidant without having to alter the stack design for any one particular flow pattern. What is also needed is a stack design which allows both external and internal manifolding to increase flexibility in use of the stack. An additional need is an interconnect which helps achieve the above needs of the solid oxide fuel stack. Yet another need is for an interconnect which requires less material and fewer processing steps in its manufacture.

SUMMARY OF THE INVENTION

A solid oxide fuel cell stack comprises a plurality of solid oxide fuel cells juxtaposed to one another; and at least one interconnect disposed among the cells, with the interconnect being capable of providing an electrical connection between at least two of the cells, and the interconnect being configured to provide a plurality of channels integrally formed with one another on opposing surfaces of the interconnect.

An interconnect for a solid oxide fuel cell stack comprises a plurality of first depressions described by a first surface of the interconnect; a plurality of first channels described by the first depressions, with the first channels describing an oxidant path across the interconnect; a plurality of second depressions described by a second surface of the interconnect, with the second surface being oppositely disposed to the first surface; and a plurality of second channels described by the second depressions, with the second channels being integrally formed with the first channels, and the second channels describing a fuel path integrally formed with the oxidant path.

These and other features, aspects and advantages of the present invention will become better understood with reference to the following drawings, description and claims.

DETAILED DESCRIPTION OF THE INVENTION

Figure 1:
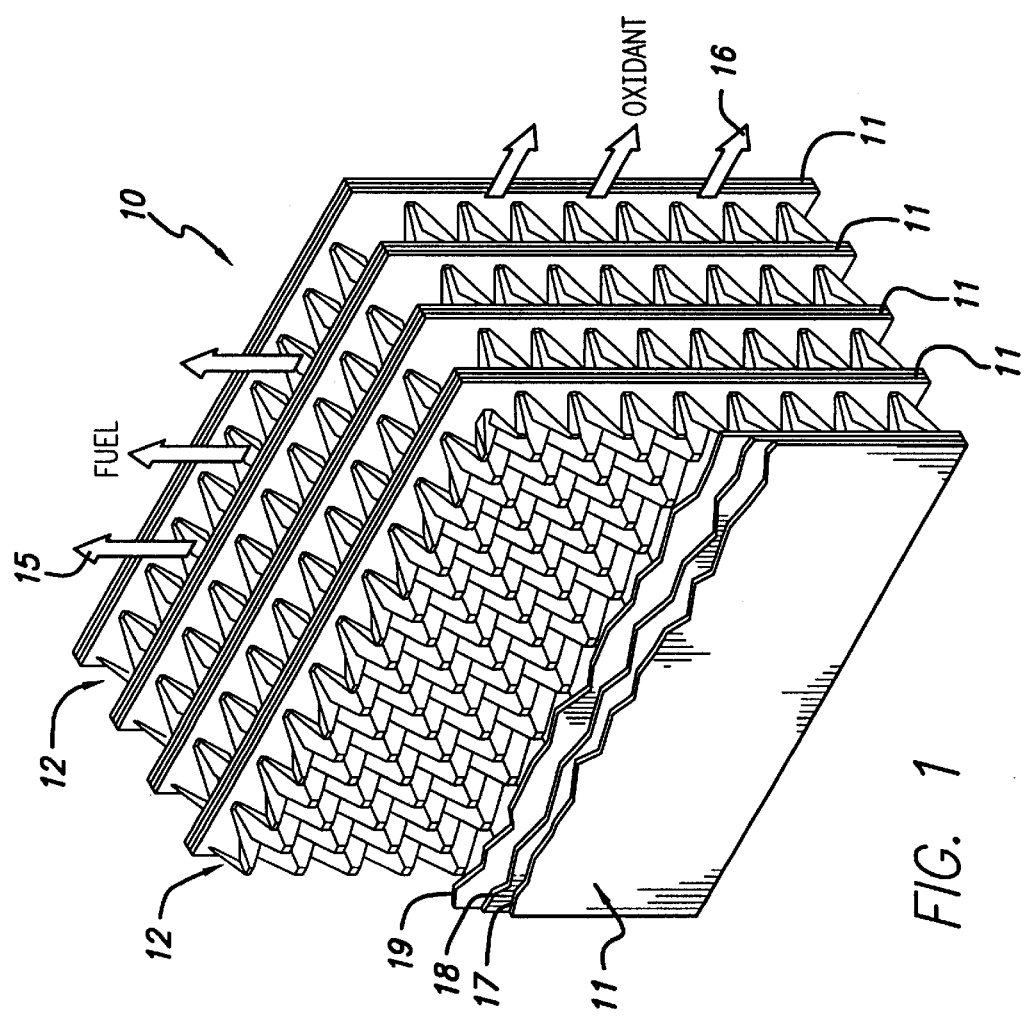
FIG. 1 is an elevated, perspective view of a solid oxide fuel cell stack according to an embodiment of the present invention.

In referring to FIG. 1, a preferred embodiment of a solid oxide fuel cell stack 10 comprises a plurality of similarly constructed fuel cells 11 with a plurality of similarly configured interconnects 12 therebetween. Specifically, the fuel cell stack 10 comprises a series of a single alternating cell 11 with a single interconnect 12. Nevertheless, the present invention contemplates that differently constructed fuel cells 11 may be used in the fuel stack 10. Similarly, the invention contemplates that differently configured interconnects 12 may be utilized in the fuel stack 10.

Figure 3:
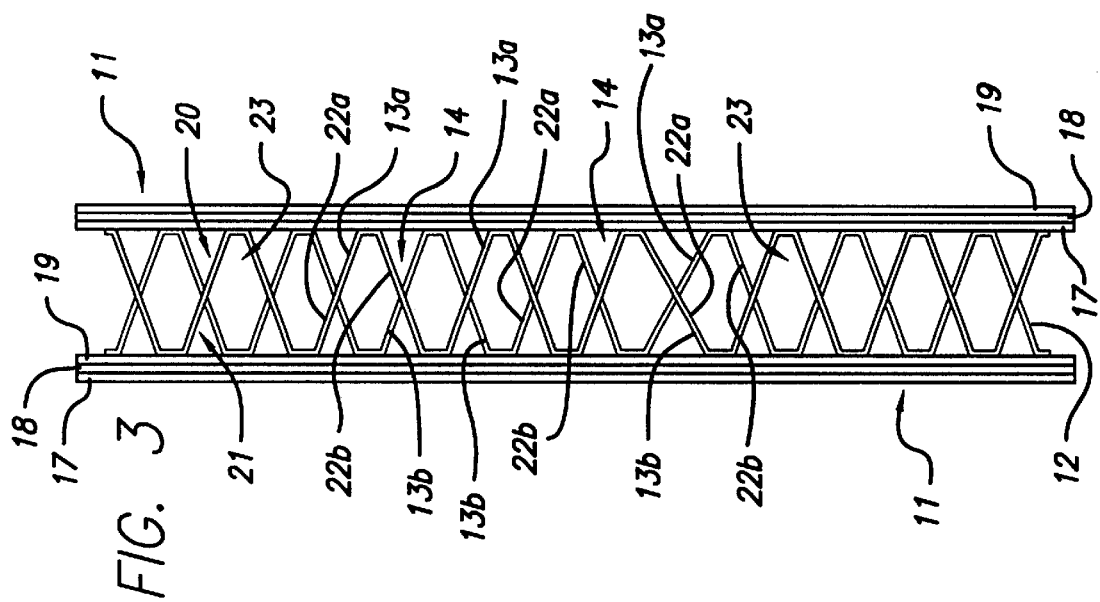
FIG. 3 is a side, cross-sectional view of an interconnect according to one embodiment of the present invention and disposed between two solid oxide fuel.

As better shown in FIG. 3, each fuel cell 11 comprises relatively flat layers of a cathode layer 17, an anode layer 19 and an electrolyte layer 18 therebetween. The composition of the cathode layer 17, anode layer 19, and the electrolyte layer 18 can be of any well-known elements in the art. For example, the cathode layer 17 can be made of a doped lanthanum manganite, while the anode layer 19 can be made of a nickel/YSZ cermet. The electrolyte layer 18 can be made of a dense yttria-stabilized zirconia.

The method of making the cathode layer 17, anode layer 19, and the electrolyte layer 18 can likewise be by any well-known method practiced in the art, such as tape calendering. Examples of tape calendering are described in U.S. Pat. Nos. 5,286,322 and 5,162,167. The thicknesses of the cathode layer 17, anode layer 19, and the electrolyte layer 18 can vary. In practice, thicknesses of the cathode layer 17 and anode layer 19 can range from about 1 to 100 mils.

Immediately adjacent fuel cells 11 are juxtaposed to one another in a substantially parallel orientation. Thus, one cell 11 has its anode layer 19 oppositely facing the cathode layer 17 of the immediately adjacent (i.e., second) cell 11, as best shown in FIGS. 1 and 3. Thereby, the anode layer 19 of such immediately adjacent (i.e., second) cell 11 will be oppositely facing the cathode layer 17 of the next immediately adjacent (i.e., third) cell 11. By such arrangement of cells 11, each cathode layer 17 is disposed adjacent a flow of an oxidant along an oxidant path 16 provided by the interconnect 12, as further described below. Likewise, each anode layer 19 is disposed adjacent a flow of a fuel along a fuel path 15 provided by the interconnect 12, as also described below.

Preferably, the interconnect 12 is of a single piece construction and made of an oxidation resistant metal which, for example, can be nickel chromium or iron chromium based. With the preferred single piece construction, the configuration of the interconnect 12 can be made by well known processes such as embossing. In this particular embodiment of the invention, the interconnect 12 has a configuration that may be generally described as an egg carton. Further, while the overall shape of the interconnect 12 depicted in the accompanying drawings is rectangular, the present invention contemplates other useable shapes, such as circular.

Figure 2:
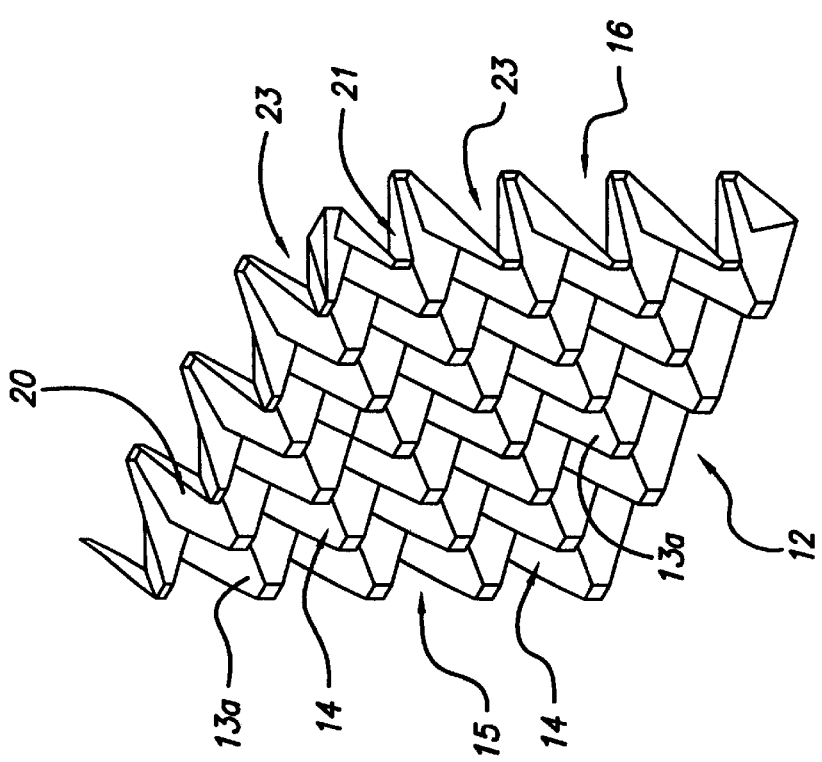
FIG. 2 is an elevated, perspective view of a portion of an interconnect according to an embodiment of the present invention and which can be used in the solid oxide fuel cell stack depicted in FIG. 1.

Irrespective of its particular overall shape, the interconnect 12 comprises a first surface or side 20 and an oppositely disposed second surface or side 21 (as best shown in FIG. 2). The first and second surfaces 20, 21 have respective first and second configurations which provide oxidant passageways 14 and fuel passageways 23 described below. In one embodiment (FIG. 2), the first and second configurations are substantially the same. In another embodiment (FIG. 4), the configurations are different.

In either embodiment (FIGS. 2 and 4), the first and second configurations are reflections of one another. More specifically, the first configuration integrally forms or defines the second configuration, and vice versa. In other words, the manufacturing of one of the two configurations necessarily provides the other configuration without having to separately manufacture the other configuration. Accordingly, the oxidant passageways 14 and fuel passageways 23 are integrally formed with one another. Having each set of passageways 14, 23 form or define one another is distinguishable from past SOFC designs. Prior designs, such as those described above, typically provide nonintegrated or separately formed passageways.

In the embodiment shown in FIG. 2, the first configuration of the first surface 20 is defined, in part, by a plurality of evenly, spaced apart extensions 13a. Also, in such embodiment, the extensions 13a are of equal size and pyramid in shape. The extensions 13a (in FIGS. 2 and 3) generally extend perpendicularly away from what would otherwise be a planar area of the first surface 20. Notwithstanding the depiction in FIGS. 2 and 3, the extensions 13a need not be all of the same size. And shapes other than pyramidal, such as rectangular and cylindrical, may also be employed.

For this first embodiment, the extensions 13a are disposed in evenly spaced rows (as best seen in FIG. 2), with the rows being offset to one another (as best seen in FIG. 3). Preferably, the rows of extensions 13a cover the entire first surface 20. However, the rows need not be evenly spaced and the rows need not cover the entire first surface 20. If the rows of extensions 13a are evenly spaced, evenly spaced depressions 22a are thereby formed among the extensions 13a such that there are alternating extensions 13a and depressions 22a.

In turn, the depressions 22a form a plurality of first channels or oxidant passageways 14 across the first surface 20. As can be appreciated, since the rows of extensions 13a are offset to one another, as are the depressions 22a, the first channels 14 follow undulating paths. Also, with the extensions 13a and depressions 22a preferably covering the entirety of the first surface 20, the first channels 14 likewise extend over the entirety of the first surface 20. The totality of the first channels or oxidant passageways 14, in turn, define an oxidant path 16 through which an oxidant can flow, as seen in FIG. 1.

The second configuration of the second surface 21 is, in essence, the opposite side of the first configuration of the first surface 20. In other words, if the first configuration can be described by its plurality of extensions 13a and depressions 22a, then the second configuration can be described by its plurality of extensions 13b and depressions 22b. Furthermore, and as best shown in FIG. 3, each extension 13b on the second surface 21 is integrally formed with and by an immediately opposing depression 22a on the first surface 20. Likewise, each depression 22b on the second surface 21 is integrally formed with and by an immediately opposing extension 13a on the first surface 20. Therefore, the depressions 22a,b, in this particular embodiment of the invention, are pyramid in shape because the extensions 13a,b are pyramid in shape.

With the extensions 13a being in offset rows, it can be appreciated that the extensions 13b and depressions 22b are formed in offset rows. And also like the depressions 22a, the depressions 22b describe a plurality of second channels or fuel passageways 23 which extend across the second surface 21 in undulating paths. With the depressions 22b covering the entirety of the second surface 21, the second channels 23 likewise extend over the entirety of the second surface 21.

The totality of the second channels 23, in turn, define a fuel path 15 through which a fuel can flow, as seen in FIG. 1. Moreover, the fuel path 15 extends only across one side (i.e., the second surface 21) of the interconnect 12, while the oxidant path 16 extends only across the opposite side (i.e., the first surface 20). The fuel and oxidant can thereby remain physically separated from one another as they move along their respective paths 15, 16.

Figure 4:
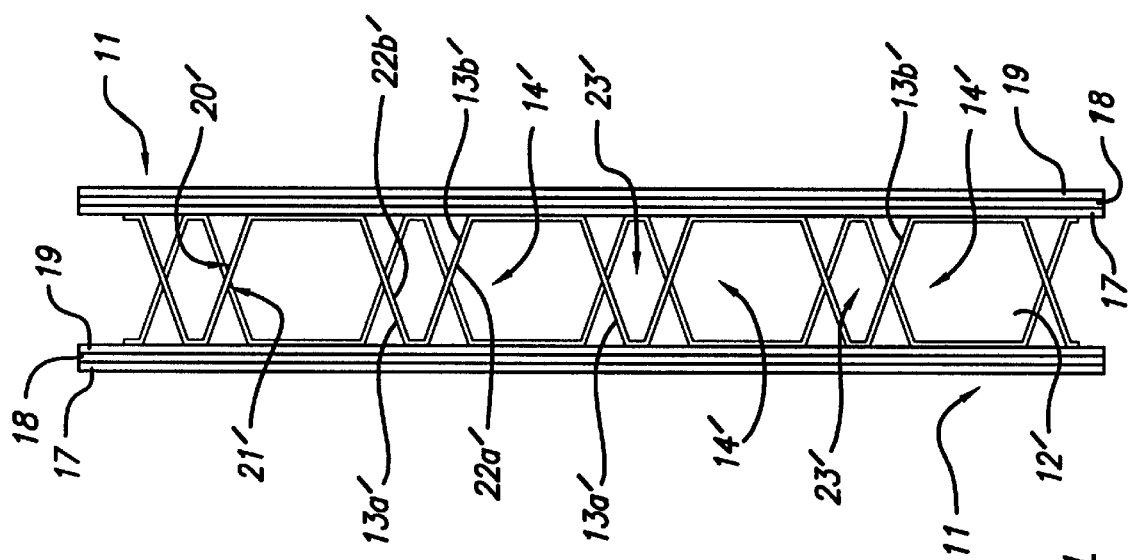
FIG. 4 is a side, cross-sectional view of an interconnect according to a second embodiment of the present invention and disposed between two solid oxide fuel cells.

As noted above, the interconnect 12 may be nonsymmetrical in its overall shape (i.e., the first and second surfaces 20, 21 have different configurations). In such instance, for example, an interconnect 12' comprises extensions 13a' and depressions 22a' on a first surface 20', together with extensions 13b' and depressions 22b' on a second surface 21' (FIG. 4). The depressions 22a' describe channels 14', while the depressions 22b' describe channels 23'. However, for the embodiment shown in FIG. 4, it can be seen that the extensions 13a' are smaller in area than the extensions 13b'. Doing so causes the channels 14' to be of a first configuration and the channels 23' to be of a second configuration. Specifically, the channels 14' are larger in area than the channels 23'. A larger size of the channels 14' may be desirable, for example, to increase the flow rate/volume of the oxidant for greater cooling capacity of the fuel stack 10

In referring back to FIG. 3, it can also be appreciated that the fuel path 15 and oxidant path 16 of each interconnect 12 are respectively disposed adjacent an anode layer 19 of one cell 11 and a cathode layer 17 of another cell 11. This allows a fuel to flow along the fuel path 15 and permit reaction between the fuel and anode layer 19. The oxidant can similarly flow along the oxidant path 16 for reaction with the cathode layer 17. And because the interconnect 12 is in electrical contact with adjacent cells 11 (FIG. 3), as current is established in one cell 11, the interconnect 12 can carry the current into the adjacent cell 11. In turn, the next interconnect 12 can carry the current from such adjacent cell 11 and into the next adjacent cell 11.

Furthermore, it can be seen that the overall configuration of the interconnect 12 provides a fuel path 15 and an oxidant path 16 which are not restricted to a single flow direction. Instead, the fuel path 15 can be in all four directions on a compass, in addition to a radial flow from the center of the interconnect 12, as can the oxidant path 16. The capability of multiple directions of flows results from the extensions 13a,b and depressions 22a,b being in rows. And because of the ability to flow in multiple directions, while the fuel and oxidant remain physically separated from one another, flow patterns consisting of coflow, crossflow, counterflow and radial flow can be achieved with a single stack 10 design. In other words, the configuration of the interconnect 12 does not have to be changed to accommodate a particular flow pattern. Nor does the configuration of the anode or cathode layers 17,19, or other parts of the stack 10, require change for any one flow pattern.

It can also be seen that the present invention achieves a reduction in stack thickness over typical past stack designs, particularly those which have separately shaped anodes and cathodes which provide fuel/oxidant passageways. In effect, the present invention reduces the overall stack 10 thickness by about one-half. That reduction is achieved by having integrated fuel and oxidant paths 15, 16 whereby one path forms or defines the other path. The integrated paths 15, 16 are distinguishable from prior designs which utilize two separately formed paths. Therefore, the need for one of the two separately configured passageways used in the prior art is eliminated. Additionally, the integrated paths 15,16 in the interconnect 12 can reduce the number of manufacturing steps needed to create the paths 15,16 when compared to past designs. In the present invention, having one set of the passageways integrally form or define the other set of passageways results from the manufacturing process employed.

The manufacturing/shaping of the interconnect 12 of the present invention involves the first surface 20 being configured at the same time the second surface 21 is being configured. Such concurrent manufacturing/shaping is different from prior methods whereby the opposing surfaces of the interconnect (or anode/cathode) are separately manufactured/shaped. But with concurrent configuring, as in the present invention, the number of manufacturing steps may be reduced in half.

Figure 5:
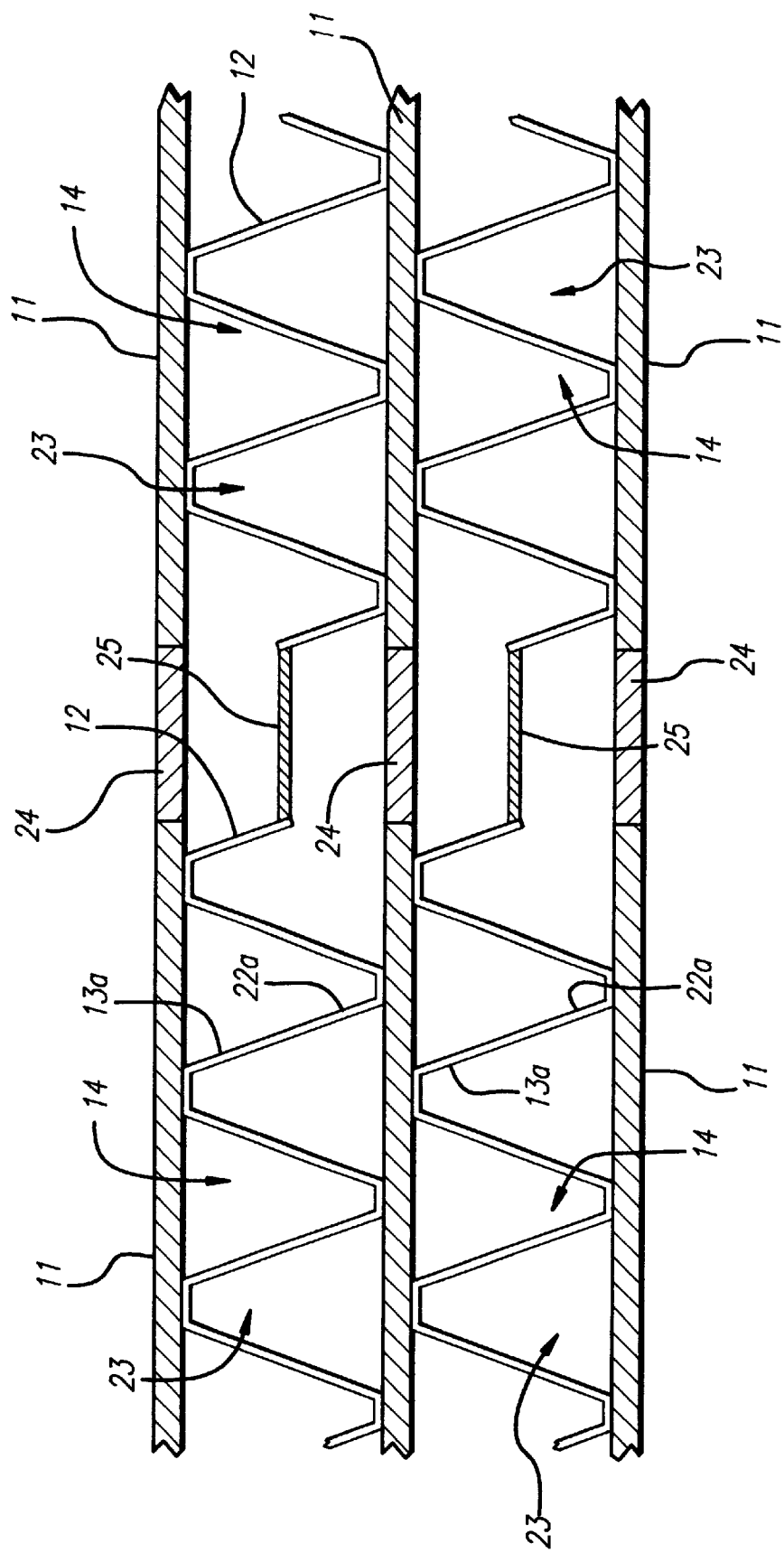
FIG. 5 is a side cross-sectional view of a plurality of solid oxide fuel cell stacks according to an embodiment of the present invention and which are electrically connected to one another.

The present invention also contemplates that a plurality of fuel cell stacks 10 can be combined, as shown in FIG. 5, to increase the overall voltage achieved. Also, with the use of multiple stacks 10, a particular voltage may be achieved while reducing the space otherwise required by a single stack 10. In FIG. 5, two stacks 10 may, for example, be joined with insulating elements 24, such as zirconia or alumina. Insulating elements 25, similar to the insulating elements 24, may be used to join adjacent interconnects 12. The two stacks 10 may be used in lieu of a single stack 10 which is of a particular size and achieves a particular voltage. Thus, if the single stack 10 is "cut" into two stacks 10, the two stacks 10 can, in the aggregate, equal the size of the single stack 10 but increase the voltage by twofold. Alternatively, if two stacks 10 are used, they can be smaller in size but provide the same voltage as a single stack 10.

Also achieved in the present invention is flexibility in manifolding. Either external or internal manifolding can be used with the fuel cell stack 10. For external manifolding, manifolding sections, as an example, may be attached to the edges of the stack 10 for ducting gases in and out of the stack 10. Such manifolding, as an example, is shown in N. Minh et al., Science and Technology of Ceramic Fuel Cells, pp. 284, Elsevier (1995). For internal manifolding, the center of the interconnect 12 and cells 11 may be drilled with a hole. The hole can then be used to insert a gas distribution cylindrical body, as an example. The cylindrical body may have openings to supply gases to interconnects 12. Such a construction is shown, for example, in N. Minh et al., supra, at pp. 286 and U.S. Pat. No. 5,549,983.

It should be understood, of course, that the foregoing relates to preferred embodiments of the invention and that modifications may be made without departing from the spirit and scope of the invention as set forth in the following claims.

What is claimed is:

1. A solid oxide fuel cell stack, comprising:

a plurality of solid oxide fuel cells juxtaposed to one another; and at least one interconnect disposed among said cells, said interconnect being capable of providing an electrical connection between at least two of said cells, and said interconnect being configured to provide fuel channels and oxidant channels integrally formed with one another by opposing surfaces of said interconnect such that said fuel channels form and define said oxidant channels and said oxidant channels form and define said fuel channels to eliminate a separately formed layer of fuel or oxidant channels from said stack whereby a fuel and an oxidant flow in a crossflow pattern, coflow pattern, counterflow pattern, and radial pattern through said stack in the absence of changing a configuration of said interconnect.

2. The stack of claim 1, wherein each of said cells has a substantially flat configuration.

3. The stack of claim 1, further comprising a plurality of said interconnects, each of said interconnects being disposed among said cells such that said stack comprises alternating cells and interconnects.

4. The stack of claim 1, wherein said interconnect further comprises a plurality of extensions and depressions in each of said opposing surfaces.

5. The stack of claim 1, wherein said channels comprise first channels and second channels, said first channels having a first configuration and said second channels having a second configuration different from said first configuration.

6. A solid oxide fuel cell stack, comprising:

a plurality of solid oxide fuel cells juxtaposed to one another, with at least two of said cells having a substantially flat configuration; each of said two cells comprising an anode layer, an electrolyte layer, and a cathode layer; and at least one interconnect disposed among said plurality of cells, said interconnect being capable of providing an electrical connection between said cells, and said interconnect comprising a plurality of first extensions on a first surface of said interconnect and a plurality of second depressions on a second surface of said interconnect, said first extensions comprised of said second depressions and said second depressions comprised of said first extensions such that said first extensions and second depressions comprise one another and integrally form with one another a plurality of oxidant passageways and fuel passageways that form and define one another, thereby reducing the thickness by about one-half and whereby a fuel and an oxidant flow in a crossflow pattern, coflow pattern, counterflow pattern, and radial pattern through said stack in the absence of changing a configuration of said interconnects.

7. The stack of claim 6, wherein each of said plurality of cells has a substantially flat configuration.

8. The stack of claim 6, further comprising a plurality of said interconnects, each of said interconnects being disposed among said cells such that said stack comprises alternating cells and interconnects.

9. The stack of claim 7, wherein immediately adjacent cells are juxtaposed such that an anode layer of one cell is oppositely facing a cathode layer of another cell.

10. The stack of claim 6, wherein said oxidant and fuel passageways are integrally formed with one another.

11. The stack of claim 6, wherein said first surface further comprises a plurality of first depressions and said second surface further comprises a plurality of second extensions.

12. A solid oxide fuel cell stack, comprising:

a plurality of solid oxide fuel cells juxtaposed to one another; and a plurality of interconnects disposed among said cells, at least one of said interconnects comprising a first surface and an opposing second surface, said first surface being configured to provide an oxidant path that concomitantly forms and defines said second surface to provide a fuel path integrally formed with said oxidant path, thereby reducing the thickness by about one-half and whereby said interconnects flow a fuel and an oxidant in a crossflow pattern, coflow pattern, counterflow pattern, and radial pattern through said stack in the absence of changing a configuration of said interconnects.

13. The stack of claim 12, wherein said interconnects are disposed among said cells such that a single interconnect alternates with a single cell.

14. The stack of claim 12, wherein each of said interconnects comprises said first and second surfaces.

15. The stack of claim 12, wherein said oxidant path has a configuration different from said fuel path.

16. The stack of claim 12, wherein said oxidant path has a configuration substantially the same as said fuel path.

17. The stack of claim 12, wherein said first and second surfaces comprise a plurality of extensions integrally formed with a plurality of depressions.

18. The stack of claim 17, wherein said extensions are pyramid in shape.

* * * * *